United States Patent
Yoshimoto et al.

(10) Patent No.: US 11,977,377 B2
(45) Date of Patent: May 7, 2024

(54) REMOTE OPERATION APPARATUS, REMOTE OPERATION METHOD, NON-TRANSITORY COMPUTER READABLE MEDIUM, AND REMOTE OPERATION SYSTEM

(71) Applicant: NEC Corporation, Tokyo (JP)

(72) Inventors: Tatsuya Yoshimoto, Tokyo (JP); Hiroshi Yoshida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 147 days.

(21) Appl. No.: 17/054,822

(22) PCT Filed: Mar. 8, 2019

(86) PCT No.: PCT/JP2019/009331
§ 371 (c)(1),
(2) Date: Nov. 12, 2020

(87) PCT Pub. No.: WO2019/225118
PCT Pub. Date: Nov. 28, 2019

(65) Prior Publication Data
US 2021/0247759 A1 Aug. 12, 2021

(30) Foreign Application Priority Data
May 22, 2018 (JP) .................... 2018-098095

(51) Int. Cl.
*B66F 9/075* (2006.01)
*B60W 30/18* (2012.01)
(Continued)

(52) U.S. Cl.
CPC ..... *G05D 1/0022* (2013.01); *B60W 30/18109* (2013.01); *B62D 15/021* (2013.01); *G05D 1/0016* (2013.01)

(58) Field of Classification Search
None
See application file for complete search history.

(56) References Cited

U.S. PATENT DOCUMENTS

| 6,430,471 B1 | 8/2002 | Kintou et al. |
| 2013/0317675 A1 | 11/2013 | Kumazawa et al. |

(Continued)

FOREIGN PATENT DOCUMENTS

| EP | 2677385 A1 | 12/2013 |
| JP | 2000-184469 A | 6/2000 |

(Continued)

OTHER PUBLICATIONS

International Search Report corresponding to PCT/JP2019/009331, 2 pages, dated Jun. 11, 2019.

*Primary Examiner* — Adam D Tissot
*Assistant Examiner* — Laura E Linhardt
(74) *Attorney, Agent, or Firm* — Sughrue Mion, PLLC

(57) ABSTRACT

A remote operation apparatus capable of remotely operating a work machine efficiently and with high accuracy is provided. A remote operation apparatus (100) is connected to a work machine (200) via a communication network N, and includes an operation input unit (101) that inputs an operation signal to the remote operation apparatus (100), the operation signal in response to an operation performed by an operator, an operation calculation unit (108) that acquires a magnitude of an operation from the operation signal, an operation change amount calculation unit (109) that acquires an operation change amount from the operation signal, a communication delay time measurement unit (110) that measures a communication delay time, and a speed calculation unit (111) that calculates an operation speed of the (Continued)

work machine (200) based on the magnitude of the operation, the operation change amount, and the communication delay time.

16 Claims, 9 Drawing Sheets

(51) Int. Cl.
    *B62D 15/02*     (2006.01)
    *G05D 1/00*     (2006.01)
    *G05D 1/02*     (2020.01)
    *H04W 4/40*     (2018.01)
    *H04W 4/80*     (2018.01)

(56) References Cited

U.S. PATENT DOCUMENTS

| | | |
|---|---|---|
| 2014/0156073 A1 | 6/2014 | Zhang et al. |
| 2015/0291180 A1 | 10/2015 | Funke et al. |
| 2021/0156114 A1* | 5/2021 | Saigo ................ F15B 7/001 |
| 2021/0173392 A1* | 6/2021 | Santos ............... H04L 43/0864 |
| 2021/0221664 A1* | 7/2021 | Okamoto ............ G05D 1/0055 |

FOREIGN PATENT DOCUMENTS

| | | |
|---|---|---|
| JP | 2011-43883 A | 3/2011 |
| JP | 5187757 B2 | 4/2013 |
| JP | 5393240 B2 | 1/2014 |
| JP | 2017-50797 A | 3/2017 |
| WO | WO-2012/111193 A1 | 8/2012 |

\* cited by examiner

REMOTE OPERATION APPARATUS, REMOTE OPERATION METHOD, NON-TRANSITORY COMPUTER READABLE MEDIUM, AND REMOTE OPERATION SYSTEM

CROSS-REFERENCE TO RELATED APPLICATIONS

This application is a national stage application of International Application No. PCT/JP2019/009331 entitled "REMOTE OPERATION APPARATUS, REMOTE OPERATION METHOD, NON-TRANSITORY COMPUTER READABLE MEDIUM, AND REMOTE OPERATION SYSTEM," filed on Mar. 8, 2019, which claims the benefit of the priority of Japanese Patent Application No. 2018-098095 filed on May 22, 2018, the disclosures of each of which are hereby incorporated by reference in their entirety.

TECHNICAL FIELD

The present disclosure relates to a remote operation apparatus, a remote operation method, a non-transitory computer readable medium, and a remote operation system.

BACKGROUND ART

Recently, for the purpose of solving the problem of shortage of labor and improving work safety at construction sites such as civil engineering sites and construction site of buildings, remote construction, in which work machines such as construction machines are remotely operated, has become popular. Commonly, in remote construction, an operator manually operates a remote operation apparatus based on information acquired by a camera or a sensor mounted on a work machine to remotely operate the work machine. For example, the operator confirms a working range of the site and its surroundings by looking at a video monitor, confirms a working sound of the site from a speaker, and operates a lever of the remote controller to remotely operate the work machine at the site.

The remote operation apparatus is connected to a work machine to be remotely operated via a communication network such as Wi-Fi, a 4G carrier line, or an Internet line. The remote operation apparatus remotely operates the work machine by transmitting and receiving operation commands, video information, sensor information, and the like to and from the work machine. However, wireless communication such as Wi-Fi is affected by radio wave attenuation that depends on the distance between communication terminals, radio wave interference with other communication terminals on the local network, cross traffic, and noise due to weather or obstacles. Therefore, in wireless communication such as Wi-Fi, there may be a delay in communication time, fluctuation in delay, and loss of data packets. As a result, for example, delay, disturbance, and interruption of the video transmitted from the camera mounted on the work machine to the remote operation apparatus occur. Further, a delay of arrival of an operation command to the work machine or missing operation command in the work machine occurs.

As a result, the operator cannot operate the work machine accurately, and the work efficiency is lowered in comparison with that of manned construction or visual construction. For example, when an operator stops a work machine at a desired position, there is a delay in a stop command arriving at the work machine due to a delay in the communication network. Thus, the work machine stops beyond the desired position (hereinafter, this phenomenon is referred to as "overshoot"). Overshoot causes the work machine to collide with an obstacle and the construction surface of the work machine to shift, thereby lowering the work accuracy. Further, an operation for returning the work machine from the overshoot position to the desired position is required, which increases the working time.

Therefore, there is a need, not only in remote construction but also in other fields, for a technique that can more stably and efficiently implement remote operations of devices such as unmanned mobile bodies in a communication network in which a communication delay and a delay fluctuation occur.

For example, Patent Literature 1 discloses that a buffer for storing video data acquired by a camera mounted on an unmanned mobile body is included, a communication delay time between a remote operation apparatus and the unmanned mobile body is estimated, and a buffer delay time is calculated based on the communication delay time. By doing so, Patent Literature 1 intends to suppress a rapid change in the video caused by the communication delay.

Patent Literature 2 discloses that when a moving speed of an unmanned moving body is low, a remote operation is performed, whereas when the moving speed is high, automatic control is performed.

CITATION LIST

Patent Literature

Patent Literature 1: Japanese Patent No. 5393240
Patent Literature 2: Japanese Patent No. 5187757

SUMMARY OF INVENTION

Technical Problem

However, in Patent Literature 1, only the communication delay of transmission/reception of video data is considered, and the communication delay of transmission/reception of operation commands is not considered. Thus, in Patent Literature 1, the operation accuracy depends on the operator's skill, and it is not always possible to suppress the overshoot caused by the communication delay.

Further, Patent Literature 2 intends to avoid a delay in the operation due to a communication delay by switching to the automatic control mode at the time of a high-speed movement. However, the overshoot may increase depending on the communication delay time even at the time of a low-speed movement, and the operation accuracy may be lowered.

An object of the present disclosure is to provide a remote operation apparatus, a remote operation method, a remote operation program, and a remote operation system capable of remotely operating a work machine efficiently and with high accuracy.

Solution to Problem

A first example aspect of the present disclosure is a remote operation apparatus for remotely operating a work machine via a communication network. The remote operation apparatus includes: an operation input unit configured to input an operation signal to the remote operation apparatus, the operation signal in response to an operation performed by an operator for remotely operating the work machine; an operation calculation unit configured to acquire a magnitude of the operation input to the operation input unit from the operation signal; an operation change amount calculation unit configured to acquire an operation change amount representing a degree of change in the magnitude of the operation from the operation signal; a communication delay time measurement unit configured to measure, as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and a speed calculation unit configured to calculate an operation speed when the work machine is driven based on the magnitude of the operation, the operation change amount, and the communication delay time.

A second example aspect of the present disclosure is a remote operation method performed by a remote operation apparatus for remotely operating a work machine via a communication network. The remote operation method includes: calculating, by the remote operation apparatus, a magnitude of an operation performed by an operator to an operation input unit from an operation signal, the operation signal being input from the operation input unit of the remote operation apparatus for operating the work machine and in response to an operation of the operation input unit by the operator; calculating, by the remote operation apparatus, an operation change amount representing a degree of change in the magnitude of the operation from the operation signal; measuring, by the remote operation apparatus as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and calculating, by the remote operation apparatus, an operation speed when the work machine is driven based on the magnitude of the operation, the operation change amount, and the communication delay time.

A third example aspect of the present disclosure is a non-transitory computer medium storing a remote operation program for causing a remote operation apparatus to remotely operate a work machine via a communication network. The remote operation program causes the remote operation apparatus to execute: a process of acquiring a magnitude of an operation performed by an operator to an operation input unit from an operation signal, the operation signal being input from the operation input unit of the remote operation apparatus for operating the work machine and in response to an operation of the operation input unit by the operator; a process of acquiring an operation change amount representing a degree of change in the magnitude of the operation from the operation signal; a process of measuring, as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and a process of calculating an operation speed when the work machine is driven based on the magnitude of the operation, the operation change amount, and the communication delay time.

A fourth example aspect of the present disclosure is a remote operation system including a work machine and a remote operation apparatus for remotely operating the work machine via a communication network. The remote operation apparatus includes: an operation input unit configured to input an operation signal to the remote operation apparatus, the operation signal in response to an operation performed by an operator for remotely operating the work machine; an operation calculation unit configured to acquire a magnitude of the operation input to the operation input unit from the operation signal; an operation change amount calculation unit configured to acquire an operation change amount representing a degree of change in the magnitude of the operation from the operation signal; a communication delay time measurement unit configured to measure, as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and a speed calculation unit configured to calculate an operation speed when the work machine is driven based on the magnitude of the operation, the operation change amount, and the communication delay time.

Advantageous Effects of Invention

It is possible to provide a remote operation apparatus, a remote operation method, a remote operation program, and a remote operation system capable of remotely operating a work machine efficiently and with high accuracy.

DESCRIPTION OF EMBODIMENTS

An example embodiment of the present disclosure will be described below with reference to the drawings.

Figure 1:
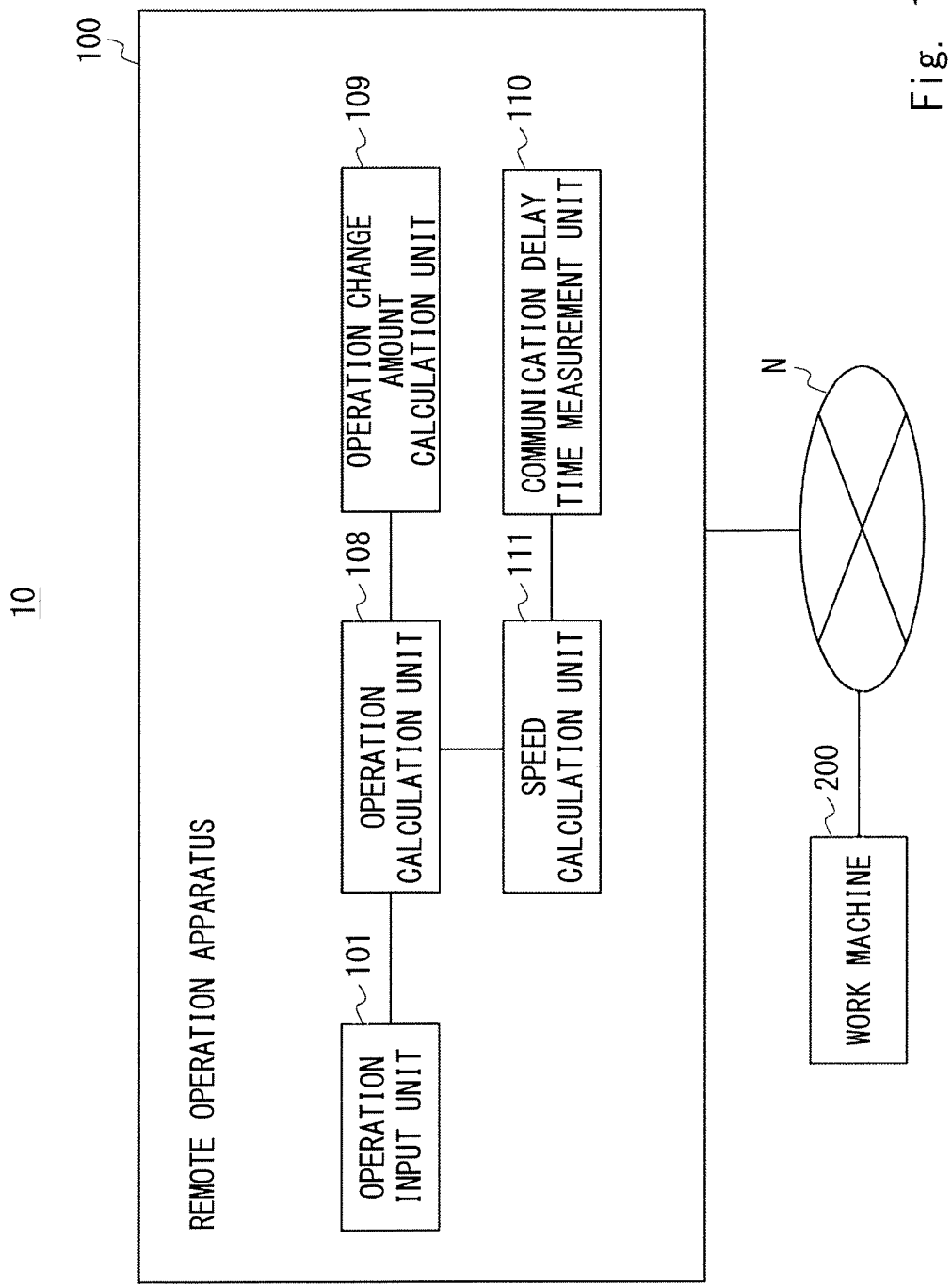
FIG. 1 is a block diagram showing an example of a remote operation apparatus according to the present disclosure.

FIG. 1 is a block diagram showing an example of a remote operation apparatus 100 according to the present disclosure. As shown in FIG. 1, the remote operation apparatus 100 includes an operation input unit 101, an operation calculation unit 108, an operation change amount calculation unit 109, a communication delay time measurement unit 110, and a speed calculation unit 111.

The remote operation apparatus 100 is communicatively connected to a work machine 200 via a communication network N. The remote operation apparatus 100, the communication network N, and the work machine 200 constitute a remote operation system 10. The remote operation apparatus 100 is operated by an operator to remotely operate the work machine 200.

The operation input unit 101 inputs an operation signal to the remote operation apparatus 100. The operation signal corresponds to the operation performed by the operator and remotely operates the work machine 200.

The operation calculation unit 108 acquires a magnitude of the operation input to the operation input unit 101 from the operation signal input from the operation input unit 101.

The operation change amount calculation unit 109 acquires an operation change amount indicating a degree of change of the size of the operation from the operation signal input from the operation input unit 101.

The communication delay time measurement unit 110 measures, as a communication delay time, an elapsed time from a time when the remote operation apparatus 100 transmits a measurement signal (predetermined signal) to the work machine 200 to a time when the remote operation apparatus 100 receives a return signal from the work machine 200. Here, the measurement signal uses the communication delay time for measurement. The return signal is, for example, a signal indicating that the work machine 200 has received the measurement signal. A transmission time of the measurement signal may be stored in the remote operation apparatus 100 or included in the measurement signal. When the transmission time is included in the measurement signal, it is necessary to include the transmission time in the return signal. That is, the communication delay time measurement unit 110 acquire the communication delay time by calculating a difference between the transmission time of the measurement signal and an arrival time of the return signal.

However, the measurement signal may be a signal dedicated for measuring the communication delay time or a predetermined signal used for other purposes. For example, as an example of using a predetermined signal used for other purposes as the measurement signal, a system configuration using a signal including operation speed information of the work machine 200 calculated by the speed calculation unit 111 can be considered. In this case, if the transmission time for transmitting the measurement signal to the work machine 200 is included in the signal, the work machine 200 can acquire the communication delay time by transmitting the return signal including the transmission time to the remote operation apparatus 100 in response to receiving this signal.

The speed calculation unit 111 calculates an operation speed when the work machine 200 is driven based on the magnitude of the operation, the operation change amount, and the communication delay time. The details of the calculation of the operation speed by the speed calculation unit 111 will be described later.

According to the remote operation apparatus 100 of the present disclosure described above, the operation speed of the work machine 200 is calculated based on the magnitude of the operation calculated by the operation calculation unit 108, the operation change amount calculated by the operation change amount calculation unit 109, and the communication delay time measured by the communication delay time measurement unit 110. Therefore, the remote operation apparatus 100 can appropriately adjust the operation speed of the work machine 200 even via the communication network N in which a communication delay occurs. In this manner, it is possible to provide the remote operation apparatus 100 capable of remotely operating the work machine 200 efficiently and with high accuracy even via the communication network N.

First Example Embodiment

Figure 2:
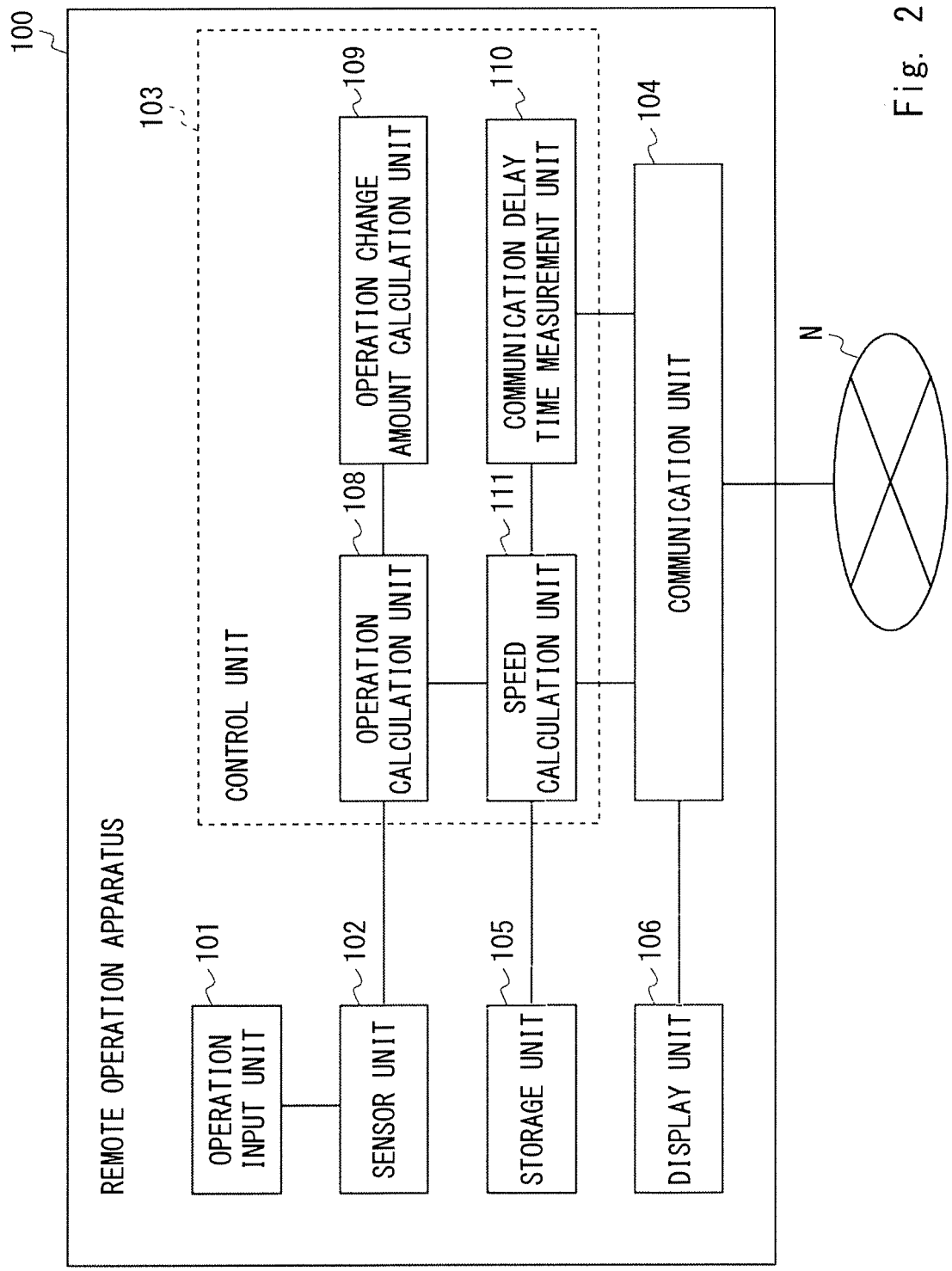
FIG. 2 is a block diagram showing an example of a remote operation apparatus according to the first example embodiment of the present disclosure.

A remote operation apparatus 100 according to a first example embodiment of the present disclosure will be described. FIG. 2 is a block diagram showing an example of the remote operation apparatus 100 according to the first example embodiment. The remote operation apparatus 100 according to the first example embodiment is, for example, a communication/control apparatus for remotely operating a work machine 200 such as a construction machine at a civil engineering site from a remote operation room or the like.

As shown in FIG. 2, the remote operation apparatus 100 includes an operation input unit 101, a sensor unit 102, a control unit 103, a communication unit 104, a storage unit 105, and a display unit 106. The control unit 103 includes an operation calculation unit 108, an operation change amount calculation unit 109, a communication delay time measurement unit 110, and a speed calculation unit 111. The remote operation apparatus 100 is connected to a communication network N. The remote operation apparatus 100 is communicatively connected to the work machine 200 via the communication network N. The remote operation apparatus 100 is operated by an operator to remotely operate the work machine 200.

The communication network N includes, for example, a local communication scheme such as a specific low-power radio and a wireless LAN (Wi-Fi), a carrier line such as 4G and 5G, and IP communication via the Internet (Internet Protocol). Thus, the remote operation apparatus 100 can remotely operate the work machine 200 via a ultra-long-distance communication of about several tens to several hundred kilometers. In the following example embodiments, it is assumed that the remote operation apparatus 100 and the work machine 200 perform data communication by IP communication.

The work machine 200 includes a video acquisition unit such as a camera (not shown), and the video acquired by the video acquisition unit is processed as video data by a camera encoder and transmitted to the remote operation apparatus 100 via the communication network N. The video data received by the remote operation apparatus 100 is decoded by a decoder and displayed on the display unit 106. Thus, the operator can recognize the situation of the work site. A plurality of cameras may be mounted on one work machine 200, and an overhead view camera may be mounted thereon.

The operation input unit 101 includes an input interface (not shown) for the operator to manually operate the work machine 200, and acquires the operation of the input interface performed by the operator as operation input information. The input interface is, for example, a joystick lever (hereinafter referred to as a lever) in the remote controller. A plurality of levers may be mounted on the remote controller. The operation input unit 101 may be shaped like various operation levers provided in a driver's seat of the ordinary work machine 200.

The sensor unit 102 acquires the operation input information acquired by the operation input unit 101 as an operation signal. The operation signal acquired by the sensor unit 102 is, for example, serial data or the like, and is transmitted to the control unit 103. Further, when a plurality of levers are mounted on the remote controller, for example, one lever may be inclinable in the two axial directions that are orthogonal to each other, and two drive mechanisms of the work machine 200 may be operated by operations in the respective axial directions. For example, when the work machine 200 is a backhoe, the bucket and the boom may be operated by the operator operating a right hand lever included in the remote controller, and the arm may be operated and rotated by operating a left hand lever included in the remote controller. That is, the operation signal acquired by the sensor unit 102 includes an inclined angle (hereinafter referred to as an steering angle) of each lever in the axial direction. The sensor unit 102 acquires the operation signal every predetermined time and sequentially acquires the latest value.

Figure 3:
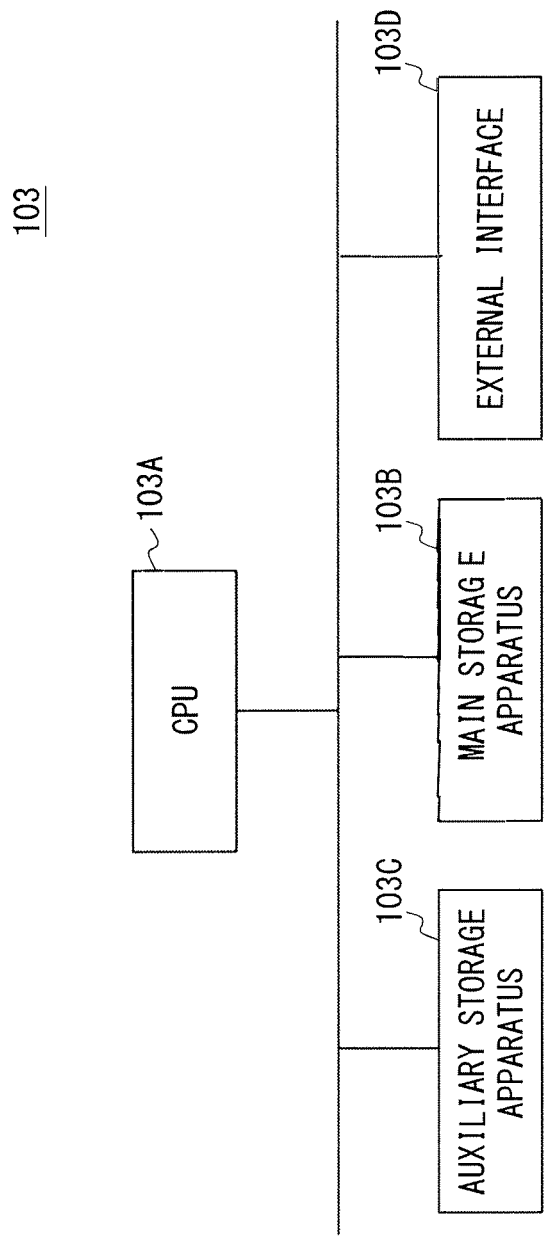
FIG. 3 is a block diagram showing an example of a control unit of the remote operation apparatus according to the first example embodiment of the present disclosure.

As shown in FIG. 3, the control unit 103 includes a CPU 103A, a main storage apparatus 103B, an auxiliary storage apparatus 103C, and an external interface 103D. The CPU 103A executes a remote operation program, thereby achieving the processing of each unit of the remote operation apparatus 100. The remote operation program is stored, for example, in the auxiliary storage apparatus 103C. The CPU 103A reads the program from the auxiliary storage apparatus 103C, deploys the program in the main storage apparatus 103B, and executes processing in accordance with the program. When the CPU 103A executes the remote operation program, the control unit 103 functions as the operation calculation unit 108, the operation change amount calculation unit 109, the communication delay time measurement unit 110, the speed calculation unit 111, and the like. The operation calculation unit 108, the operation change amount calculation unit 109, the communication delay time measurement unit 110, and the speed calculation unit 111 may be implemented by different pieces of hardware.

The auxiliary storage apparatus 103C is an example of a non-transitory tangible medium. Other examples of non-transitory media include magnetic disks, magneto-optical disks, CD-ROMs (Compact Disk Read Only Memory), DVD-ROMs (Digital Versatile Disk Read Only Memory), semiconductor memories, and the like, which are connected via the external interface 103D. When the program is distributed to the control unit 103 via a communication line, the control unit 103 which has received the distributed program may deploy the program to the main storage apparatus 103B and execute the above processing.

The program may also be for achieving a part of the processing in the remote operation apparatus 100. Further, the program may be a differential program that is combined with other programs already stored in the auxiliary storage apparatus 103C to achieve processing in the remote operation apparatus 100.

Further, some or all of the components of the remote operation apparatus 100 may be implemented by general-purpose or dedicated circuitry, a processor, or a combination thereof. These components may be composed of a single chip or a plurality of chips connected via a bus. Some or all of the components may be implemented by a combination of the circuitry, etc. and program described above.

The communication unit 104 transmits predetermined data to and receives predetermined data from a video acquisition unit (not shown) such as a camera mounted on the work machine 200 connected to the communication network N. In communication with the work machine 200, a measurement signal generated by the communication delay time measurement unit 110 is transmitted, an ACK signal is received from the work machine 200, and operation speed information calculated by the speed calculation unit 111 is transmitted. In communication with the video acquisition unit mounted on the work machine 200, camera video information is received. The type of communication data handled by the communication unit 104 is determined by the form of remote construction or the communication device to be used, and is not particularly limited.

The storage unit 105 stores a processing result of the CPU 103A. The storage unit 105 also stores the magnitude of the operation calculated by the operation calculation unit 108 (steering angle information), the operation change amount calculated by the operation change amount calculation unit 109 (steering angular velocity information), the communication delay time measured by the communication delay time measurement unit 110, and the operation speed calculated by the speed calculation unit 111, which will be described later.

The display unit 106 is an output interface such as a display. The display unit 106 acquires video information transmitted from one or more cameras, such as a vehicle-mounted camera mounted on the work machine 200 and an overhead view camera installed near the work machine 200, to the communication unit 104 via the communication network N and then displays the video information.

The operation calculation unit 108 calculates, from the operation signal acquired by the sensor unit 102, information regarding the steering angle in each axial direction in which the lever of the operation input unit 101 is operated (hereinafter referred to as steering angle information), converts the steering angle information into digital data, and stores the digital data in the storage unit 105. That is, the steering angle information indicates the magnitude of the operation of the lever of the operation input unit 101 by the operator. The steering angle information is calculated every predetermined time, and the frequency of the calculation is less than or equal to the frequency at which the operation signal is acquired by the sensor unit 102. The steering angle information is calculated for each lever provided in the operation input unit 101. The steering angle information is about the steering angle for each axial direction in which the lever is operated, and includes acquisition time information that is a time at which the sensor unit 102 has acquired the operation signal.

The operation change amount calculation unit 109 calculates, from the operation signal acquired by the sensor unit 102, information regarding a steering angular velocity (hereinafter referred to as steering angular velocity information), which is an inclined angular velocity of the lever, for each axial direction in which the lever of the operation input unit 101 is operated, converts the information into digital data, and stores the digital data in the storage unit 105. That is, the steering angular velocity information represents a degree of change in the magnitude of the operation of the lever of the operation input unit 101. The steering angular velocity information is calculated every predetermined time, and the frequency of the calculation is less than or equal to the frequency at which the operation signal is acquired by the sensor unit 102. The steering angular velocity information is calculated for each lever provided in the operation input unit 101. The steering angular velocity information is information relating to the steering angular velocity in each axial direction in which the lever is operated, and includes the acquisition time information which is information about a time at which the sensor unit 102 has acquired the operation signal.

The communication delay time measurement unit 110 measures the communication delay time required for data communication with the work machine 200 to be operated. Specifically, the communication delay time measurement unit 110 measures, as the communication delay time, the elapsed time from the time when the remote operation apparatus 100 transmits the measurement signal to the work machine 200 to the time when the remote operation apparatus 100 receives the return signal from the work machine 200. More specifically, the communication delay time measurement unit 110 first transmits the measurement signal via the communication unit 104 to the work machine 200. Next, the communication delay time measurement unit 110 receives, via the communication unit 104, an ACK (Acknowledgement) signal as the return signal from the work machine 200. The communication delay time measurement unit 110 measures, as the communication delay time, a round trip communication time RTT (Round Trip Time) from the time when the remote operation apparatus 100 transmits the measurement signal to the work machine 200 until the remote operation apparatus 100 receives the ACK signal from the work machine 200. The communication delay time measurement unit 110 measures the communication delay time every predetermined time, and the communication delay time is stored in the storage unit 105.

The speed calculation unit 111 calculates the operation speed when the work machine 200 is driven based on the steering angle information as the magnitude of the operation, the steering angular velocity information as the operation change amount, and the communication delay time. Specifically, the speed calculation unit 111 acquires the latest steering angle information, the latest steering angular velocity information, and the latest communication delay time information stored in the storage unit 105 to calculate the operation speed of the work machine 200. The speed calculation unit 111 stores the calculated operation speed in the storage unit 105. The speed calculation unit 111 updates the operation speed by calculating the operation speed every predetermined time. The frequency at which the operation speed is updated is less than or equal to the frequency at which the operation signal is acquired by the sensor unit 102, the frequency at which the steering angle information is calculated by the operation calculation unit 108, the frequency at which the steering angular velocity information is calculated by the operation change amount calculation unit 109, and the frequency at which the communication delay time is calculated by the communication delay time measurement unit 110.

The speed calculation unit 111 calculates the operation speed of the work machine 200 as follows.

Firstly, an equation expressing the relationship between the steering angle (magnitude of the operation) of the lever and the operation speed of the work machine 200 is defined. The steering angle with respect to a certain axial direction of the lever is defined as θ, and the operation speed of a drive unit 203 of the work machine 200 corresponding to the steering angle θ is defined as V. When the work machine 200 includes the drive unit 203 driven by a common driving method such as a hydraulic driving type or an electric driving type drive unit, the operation speed V of the work machine 200 is monotonically increased in proportion to the lever steering angle θ. Thus, equations representing the relationship between the steering angle (magnitude of the operation) of the lever and the operation speed of the work machine 200 are the following equations (1) and (2).

$$V = F(\theta) \tag{1}$$

$$\partial F / \partial \theta > 0 \tag{2}$$

The symbol "/" in the equation (2) represents a division, and the left side represents a differential value of a function F(θ) of the variable θ. The function F(θ) representing the relationship between the steering angle of the lever and the operation speed of the drive unit 203 is determined by the characteristics of the hydraulic drive apparatus and the electric drive apparatus mounted on the work machine 200. Further, the equations (1) and (2) correspond to equations representing a relationship between a steering angle (magnitude of the operation) of the work machine 200 and the operation speed of the work machine 200 when the work machine 200 is manually operated by, for example, the operator operating the operation lever in the driver's seat provided in the work machine 200 without using the communication network N. That is, in the equations (1) and (2), the communication delay time in the communication network N is not taken into consideration. That is, the equations (1) and (2) are relational equations when a desired operation speed of the drive unit 203 of the work machine 200 operating according to the magnitude of the operation of the operation input unit 101 of the remote operation apparatus 100 matches the actual operation speed of the drive unit 200 of the work machine 203.

Next, a method for calculating the operation speed of the work machine 200 in consideration of the communication delay time in the communication network N will be described. The speed calculation unit 111 calculates the operation speed in consideration of the communication delay time in the communication network N, so that, for example, the occurrence of a phenomenon that the work machine 200 stops beyond a desired position (hereinafter referred to as overshoot) can be effectively suppressed. Thus, the remote operation apparatus 100 can perform efficient remote operations of the work machine 200 with high accuracy.

In the remote operation apparatus 100, the time from when the operator recognizes an operation status of a construction machine with a monitor image or the like, operates the operation input unit 101, and until when the information about the operation speed is transmitted to the work machine 200 corresponds to the round trip communication time (RTT) measured by the communication delay time measurement unit 110. That is, when the communication delay time occurs, a delay occurs from the time when the operator recognizes the necessity of the operation to the time when the operation of the operator is reflected in the work machine 200. For this reason, when the work machine 200 is to be stopped at a certain target position, a delay occurs from when a stop command is transmitted to the work machine 200 after the operator recognizes the position of the work machine 200 until when the work machine stops. This causes a phenomenon (overshoot) in which the work machine 200 stops beyond the target position. This may lower the working accuracy of the work machine 200. Therefore, the speed calculation unit 111 calculates the operation speed in consideration of the communication delay time, so that the overshoot can be suppressed to a predetermined value or less.

Assuming that the communication delay time of the communication network N is d, the operation speed of the work machine 200 is v, and the amount of overshoot is δ, the following equation (3) holds.

$$\delta = v \times d \tag{3}$$

That is, when the amount of overshoot is to be suppressed to a predetermined value δr less, the operation speed needs to satisfy the following equation (4):

$$v \le \delta r/d \quad (4)$$

Figure 4:
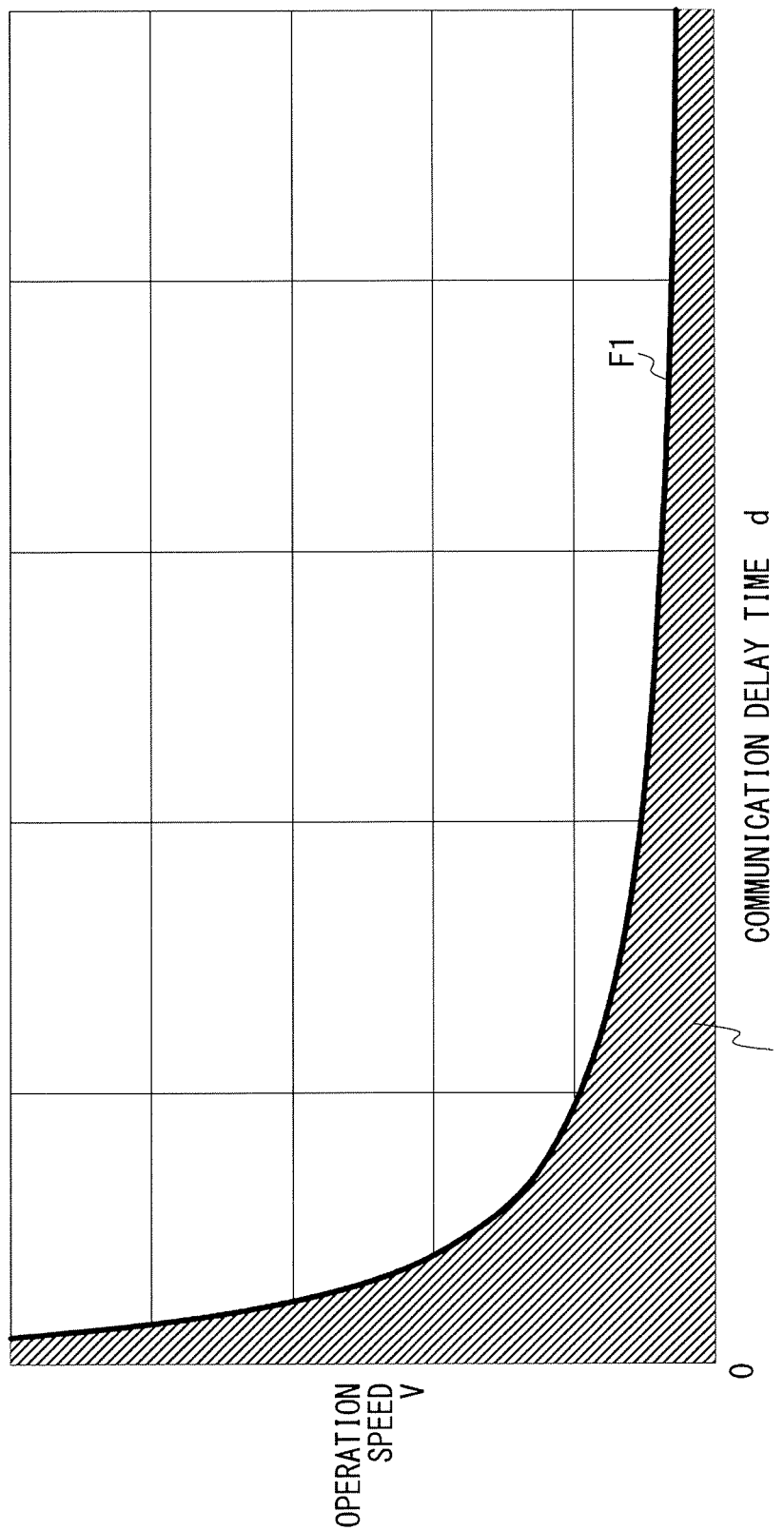
FIG. 4 is a graph showing a relationship between a communication delay time and an operation speed.

FIG. 4 is a graph showing the relationship between the communication delay time d and the operation speed v. As shown in FIG. 4, an upper limit value of the operation speed v is represented by an inverse proportional function F1 of the communication delay time d. Further, by setting the operation speed v to a value smaller than the inverse proportional function Fa, i.e., to a value within the hatched area R1, the amount of overshoot can be suppressed to the predetermined value δr or less.

As described above, in order to suppress the overshoot, it is necessary to suppress the operation speed v as the communication delay time d becomes longer. That is, in order to suppress the overshoot in the remote operation via the communication network N, the speed calculation unit 111 can calculate the operation speed V of the work machine 200 using the following equations (5) and (6).

$$V=G(\theta,d)=F(\theta)/(\beta d+1) \quad (5)$$

$$\beta>0 \quad (6)$$

Note that the coefficient β is a positive constant and is determined according to an allowable amount of overshoot.

Next, a method for calculating the operation speed of the work machine 200 in consideration of the lever steering angular velocity in addition to the communication delay time d will be described. The speed calculation unit 111 calculates the operation speed of the work machine 200 in consideration of the lever steering angular velocity in addition to the communication delay time d. By doing so, the work machine 200 can work efficiently and with high accuracy.

As described above, when the operation speed is calculated only for the purpose of controlling the overshoot, the operation speed of the work machine 200 needs to constantly controlled according to the communication delay time d, which may increase the overall operation time. Next, a method for calculating the operation speed by determining the working status from the steering angular velocity of the lever and lowering the degree of suppressing the operation speed according to the working status to thereby reduce the working time will be described.

Commonly, situations that require consideration of overshoot include a situation when the work machine 200 moves in the vicinity of the target stop position or a situation when a precise and accurate operation is needed. Specifically, such situations include, for example, slope construction by a backhoe, loading sediment onto a dump truck, and grappling of a block by a grapple type backhoe. In these situations, it is necessary to accurately stop the bucket at the target position. Therefore, careful operations are required, which tends to cause the work machine 200 not to rapidly accelerate. That is, it is assumed that the steering angular velocity of the lever is controlled to the predetermined threshold ωr or less.

On the other hand, if the work machine 200 is sufficiently distant from the target stop position and does not require a stop operation, no overshoot caused by a communication delay occurs. In such a case, the amount of suppressing the speed may be lessened. In such a situation, the operator sufficiently accelerates the work machine 200, and thus it is assumed that the steering angular velocity of the lever exceeds the predetermined threshold ωr.

In consideration of the above descriptions, the speed calculation unit 111 calculates the operation speed V of the work machine 200 using the following equations (7), (8), and (9) according to the steering angle θ of the lever, the communication delay time d, and the steering angular velocity ω of the lever.

$$V=G(\theta,d) \times \gamma(d,\omega) \quad (7)$$

$$\gamma(d,\omega)=1(\omega \le \omega r) \quad (8)$$

$$1<\gamma(d,\omega) \le \beta d+1(\omega > \omega r) \quad (9)$$

Figure 5:
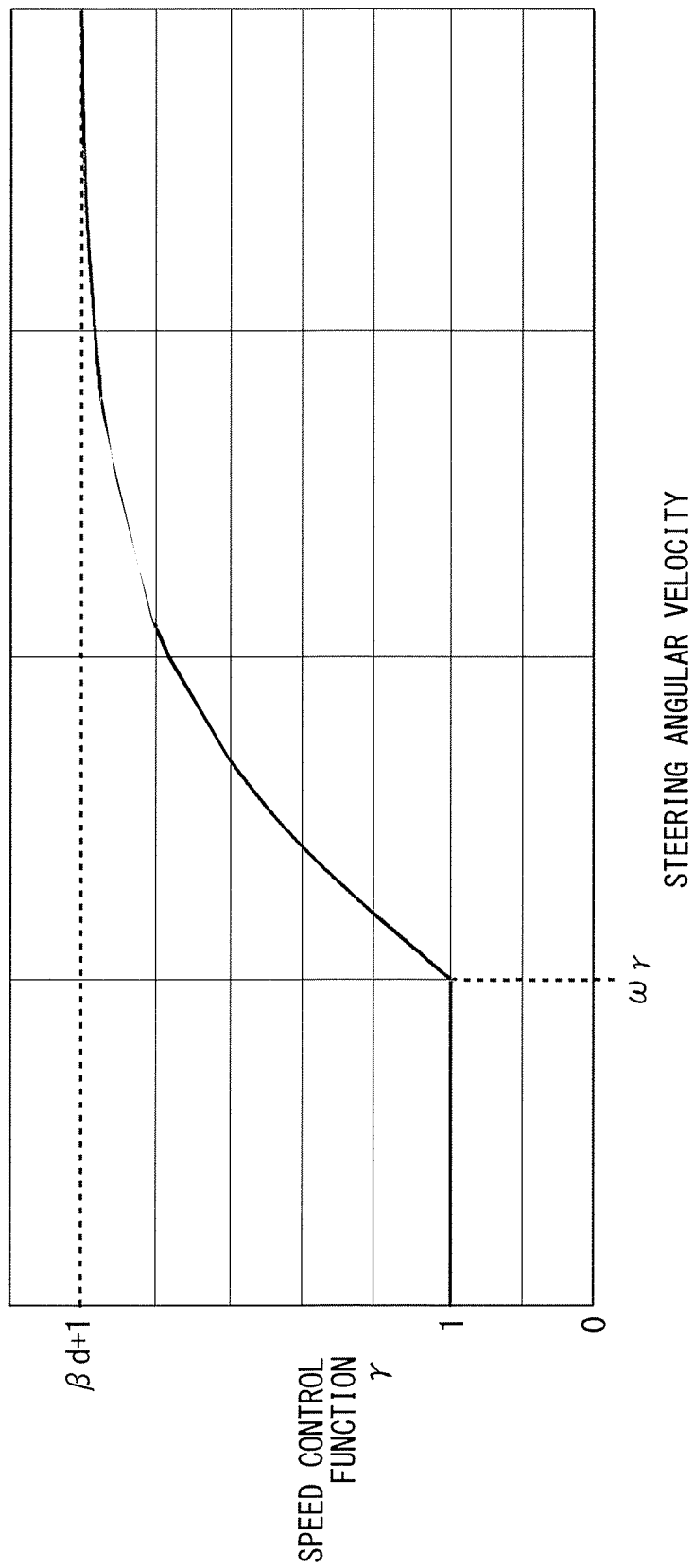
FIG. 5 is a graph for explaining an example of a speed control function according to the first example embodiment of the present disclosure.

The function γ is a speed control function for adjusting the speed suppression amount according to the steering angular velocity ω of the lever, and follows the restrictions represented by the equations (8) and (9). As shown in FIG. 5, when the steering angular velocity ω of the lever is the predetermined threshold ωr or less, γ=1 holds. That is, the operation speed V of the work machine 200 is defined by the function G(θ, d), and becomes a value at which overshoot is suppressed according to the communication delay time d. On the other hand, when the steering angular velocity ω of the lever exceeds the predetermined threshold ωr, the value of the function γ exceeds 1, and the amount of suppressing the operation speed V is lessened. This increases the operation speed V of the work machine 200, and improves the work efficiency. Note that the maximum value of the function γ is βd+1, and the operation speed V of the work machine 200 does not exceed the value of the function F(θ). That is, since the operation speed V of the work machine 200 is not increased higher than the original operation speed V, the safety can be ensured. FIG. 5 shows an example of the function γ. The function γ is not limited to the function shown in FIG. 5.

The operation speed V is calculated in inverse proportion to the communication delay time d. For this reason, the fluctuation in the operation speed V between the respective elapsed times may become large depending on the amount of fluctuation in the communication delay time d, and there is a possibility that the operability may be impaired. To address this issue, the speed calculation unit 111 performs smoothing processing on the latest operation speed value V using the latest operation speed V calculated in accordance with the equations (7), (8), and (9) and the past operation speed V stored in the storage unit 105. By doing so, the operability of the remote operation can be improved. Although a moving average filter, a Gaussian filter, or the like may be used in the smoothing processing, the method for the smoothing processing is not limited to these methods.

The speed calculation unit 111 calculates the operation speed of the work machine 101 for each lever provided in the operation input unit 200 in accordance with the above-described calculation method, corresponding to each axial direction of the lever. The information about the operation speed V calculated by the speed calculation unit 111 is transmitted to the work machine 200 via the communication unit 104.

Figure 6:
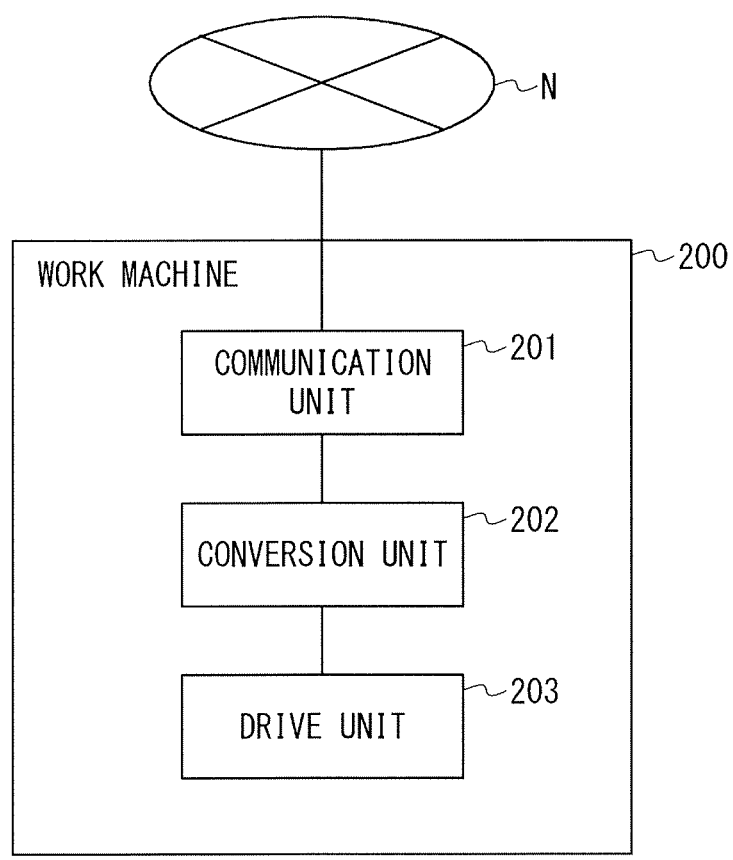
FIG. 6 is a block diagram showing an example of a work machine according to the first example embodiment of the present disclosure.

The work machine 200 is, for example, a construction machine such as a backhoe, a bulldozer, or a dump truck. Specifically, as shown in FIG. 6, the work machine 200 includes a communication unit 201, a conversion unit 202, a drive unit 203, and so on. The work machine 200 is connected to the communication network N. The work machine 200 is communicatively connected to the remote operation apparatus 100 via the communication network N. The work machine 200 may include a CPU (not shown), a storage unit (not shown), and so on. The CPU may execute a program stored in the storage unit, thereby achieving all processing in the work machine 200. In this case, the programs stored in the respective storage units of the work machine 200 include codes for achieving the processing in respective components of the work machine 200 by being executed by the CPU. Note that the storage unit includes, for example, these programs and a specified storage apparatus capable of storing various kinds of information used for the processing in the CPU. The storage apparatus is, for example, a memory or the like.

The communication unit 201 transmits predetermined data to and receives predetermined data from the remote operation apparatus 100 connected via the communication network N. Specifically, the communication unit 201 receives the measurement signal for measuring the communication delay time transmitted from the communication unit 100 of the remote operation apparatus 104, returns an ACK signal, and receives information regarding the operation speed V of the work machine 200.

The conversion unit 202 converts the information about the operation speed V of the work machine 201 received by the communication unit 200 into a drive signal. The drive signal varies depending on the drive apparatus for controlling the work machine 200. The drive signal is a current value of a motor for controlling an external cylinder of the operator's seat lever control apparatus, a hydraulic control valve inside the work machine 200, or the like.

The drive unit 203 is a drive apparatus such as a motor for controlling a cylinder and a hydraulic control valve provided in the work machine 200. The drive unit 203 operates in accordance with the drive signal (current value, etc.) input from the conversion unit 202, thereby operating each drive mechanism (bucket, arm, boom, turning, etc., in backhoe) of the work machine 200 at the operation speed V.

Figure 7:
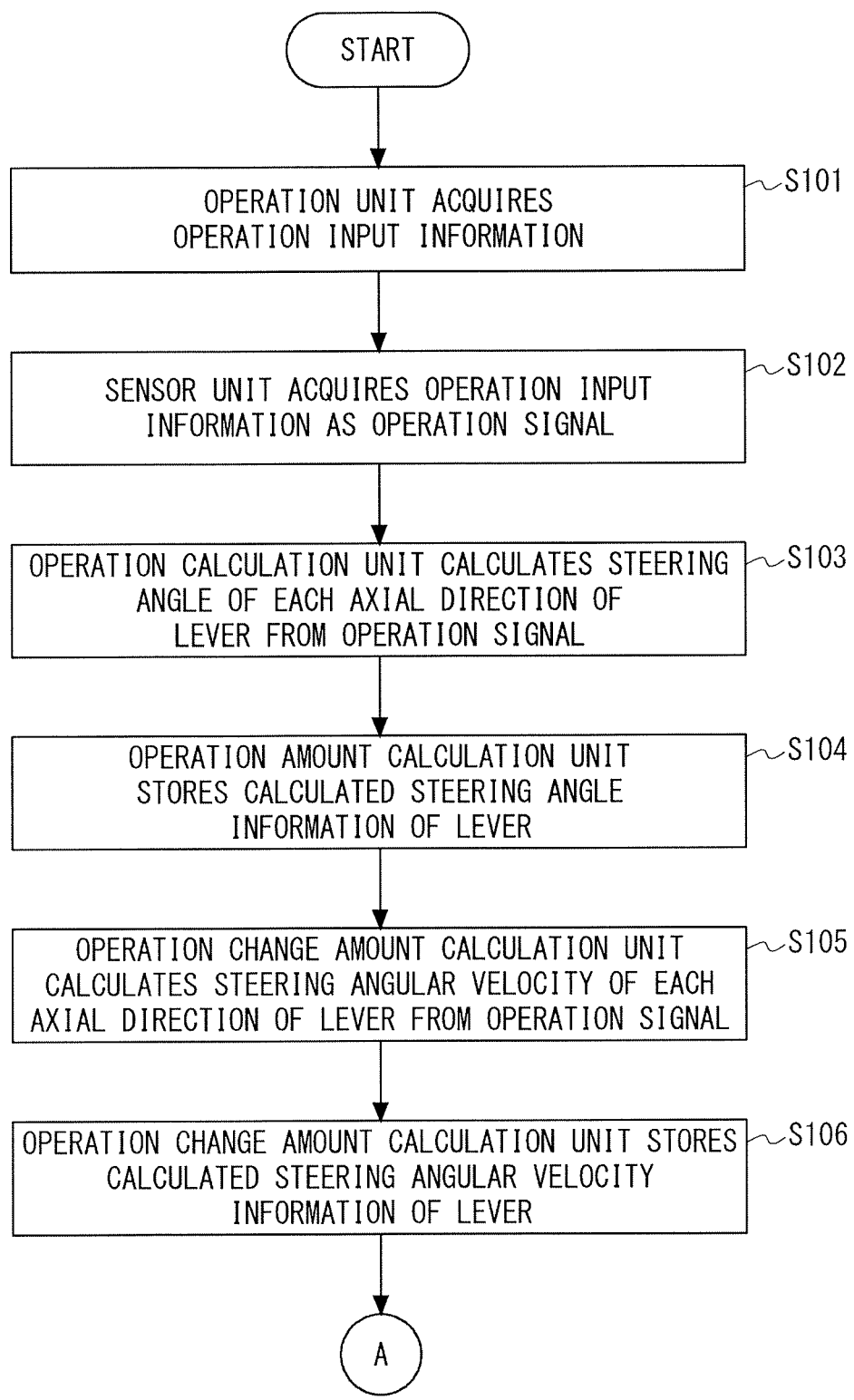
FIG. 7 is a flowchart for explaining processing of the remote operation apparatus in a remote operation method according to the first example embodiment of the present disclosure.
Figure 8:
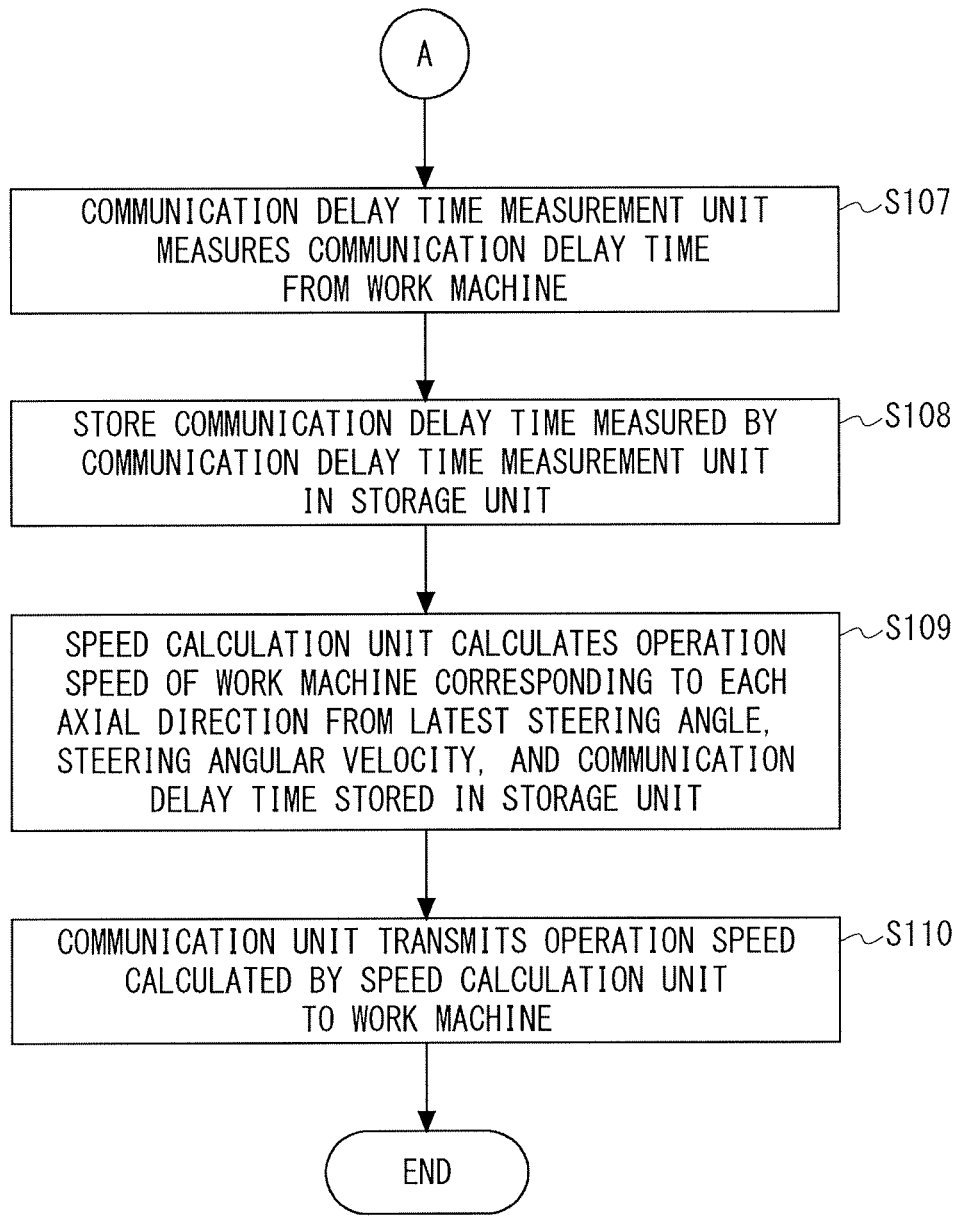
FIG. 8 is a flowchart for explaining processing of the remote operation apparatus in the remote operation method according to the first example embodiment of the present disclosure.

Next, a remote operation method in the remote operation apparatus 100 according to the first example embodiment will be described with reference to flowcharts shown in FIGS. 7 and 8.

First, the operation input unit 101 acquires an operation of the lever of the operation input unit 101 performed by the operator as the operation input information (Step S101).

Next, the sensor unit 102 acquires the operation input information acquired in Step S101 as the operation signal (Step S102). The operation signal acquired by the sensor unit 102 is, for example, serial data or the like, and is transmitted to the control unit 103. The lever may be inclined in a plurality of axial directions, and the operation input unit 101 may include a plurality of levers. Thus, the operation signal is acquired for each lever, and the operation signal of each lever includes the inclined angle (steering angle) for each axial direction. The sensor unit 102 acquires the operation signal every predetermined time and sequentially acquires the latest value. Further, the sensor unit 102 substantially acquires the steering angle for each axial direction of the lever as the operation signal at the same time.

Next, the operation calculation unit 108 calculates information about the steering angle of the lever of the operation input unit 101 (steering angle information) for each axial direction from the operation signal acquired in Step S102 (Step S103). Further, the operation calculation unit 108 converts the steering angle information into digital data, and stores the digital data in the storage unit 105 as the latest data (Step S104). The steering angle information is calculated every predetermined time, and the frequency of the calculation is equal to or less than the frequency at which the operation signal is acquired by the sensor unit 102. The steering angle information is calculated for each lever provided in the operation input unit 101. The steering angle information includes the acquisition time information, which is the information about the time when the sensor unit 102 acquires the operation signal.

Next, the operation change amount calculation unit 109 calculates, from the operation signal acquired in Step S102, information relating to the steering angular velocity which is the inclination angular velocity of the lever (steering angular velocity information) for each axial direction in which the lever of the operation input unit 101 is operated (Step S105). Then, the information regarding the steering angular velocity is converted into digital data and stored in the storage unit 105 as the latest data (Step S106). Note that the steering angular velocity information is calculated every predetermined time, and the frequency of the calculation is less than or equal to the frequency at which the operation signal is acquired by the sensor unit 102. The steering angular velocity information is calculated for each lever provided in the operation input unit 101. The steering angular velocity information includes the acquisition time information which is the information about the time when the sensor unit 102 acquires the operation signal.

Next, the communication delay time measurement unit 110 transmits the measurement signal to the work machine 200, and measures the communication delay time between the remote operation apparatus 100 and the work machine 200 (Step S107). The communication delay time is measured from the elapsed time from when the measurement signal is transmitted from the remote operation apparatus 100 to the work machine 200 until when the return signal (ACK) is received from the work machine 200. Furthermore, the communication delay time measurement unit 110 stores the latest measured value (communication delay time) measured in Step S107 in the storage unit 105 (Step S108). The communication delay time measurement unit 110 measures the communication delay time every predetermined time.

Next, the speed calculation unit 111 acquires the latest lever steering angle $\theta$ (steering angle information) stored in the storage unit 105 in Step S104, the latest lever steering angular velocity $\omega$ (steering angular velocity information) stored in the storage unit 105 in Step S106, and the latest communication delay time d stored in the storage unit 105 in Step S108, and calculates the operation speed V of the work machine 200 in accordance with the equations (7), (8), and (9) (Step S109).

The speed calculation unit 111 may perform smoothing processing on the latest operation speed value V using the latest operation speed V calculated in Step S109 and the past operation speed V stored in the storage unit 105.

Next, the communication unit 104 transmits the information about the operation speed calculated in Step S109 to the work machine 200 via the communication network N (Step S110).

The above series of processing steps in the remote operation apparatus 100 is continuously executed every predetermined time. That is, if a predetermined work performed by the operator is not completed, the processing returns to Step S101 again. On the other hand, when the operator completes the predetermined work and performs the stop processing (powering off the remote controller, etc.), the processing step of the remote operation apparatus 100 is ended.

Figure 9:
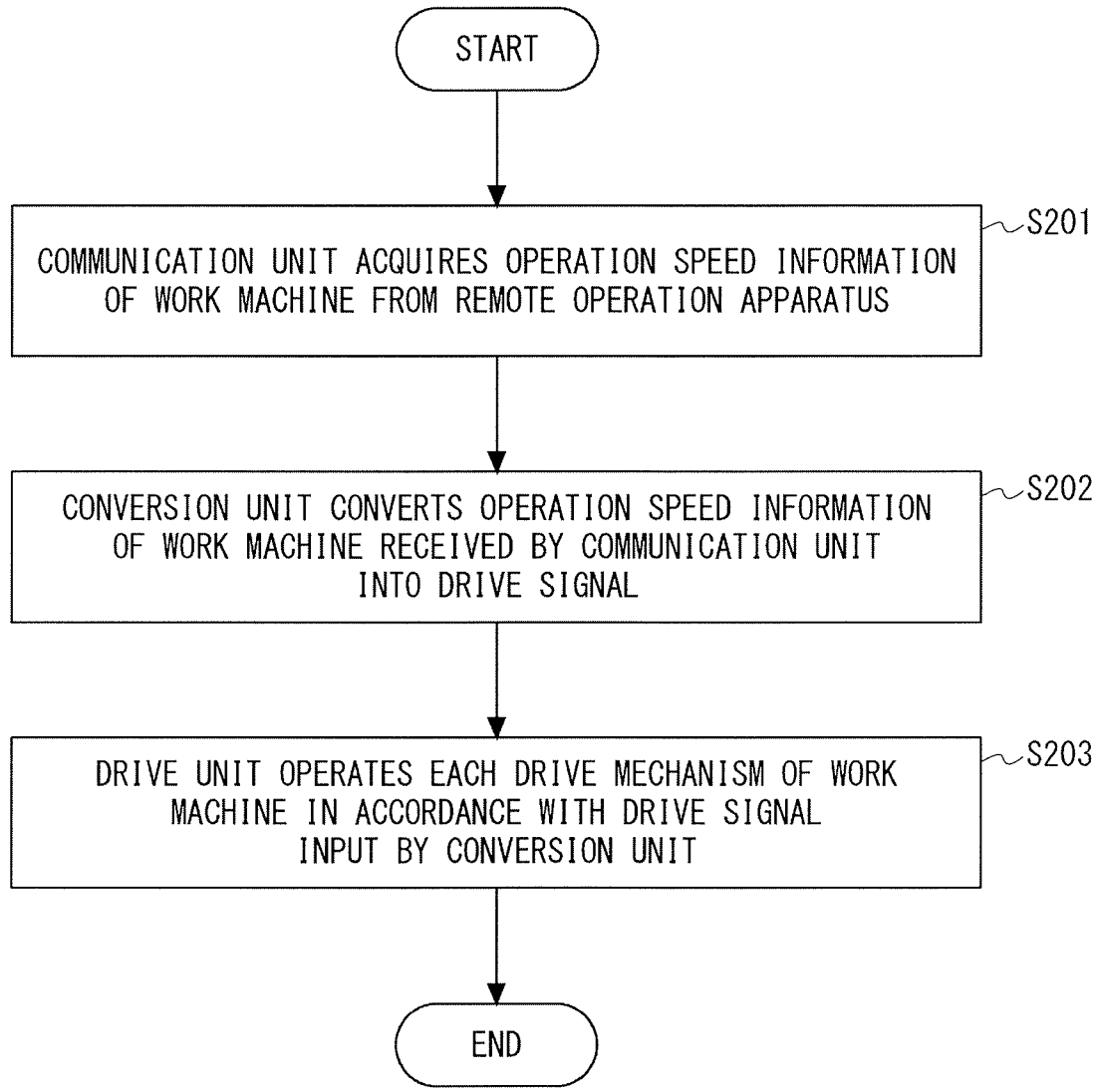
FIG. 9 is a flowchart for explaining processing of the work machine in the remote operation method according to the first example embodiment of the present disclosure.

Next, the operation of the work machine 200 in the remote operation method according to the first example embodiment will be described with reference to the flowchart shown in FIG. 9.

First, the communication unit 201 acquires the information about the operation speed of the work machine 200 transmitted from the remote operation apparatus 100 via the communication network N (Step S201).

Next, the conversion unit 202 converts the information about the operation speed of the work machine 200 acquired in Step S201 into a drive signal (Step S202). The drive signal varies depending on the drive apparatus for controlling the work machine 200. The drive signal is, for example, a current value of a motor for controlling a cylinder provided in the work machine 200, a hydraulic control valve inside the work machine 200, or the like. The conversion unit 202 inputs the drive signal to the drive unit 203 through an electronic circuit in the machine body of the work machine 200.

The drive unit 203 operates each drive mechanism of the work machine 200 at the operation speed V by operating in accordance with the drive signal (current value, etc.) input from the conversion unit 202 (Step S203). Examples of the drive mechanism of the work machine 203 controlled by the drive unit 200 include a bucket, an arm, a boom, and a swing of a backhoe. As described above, there may be a plurality of drive mechanisms of the work machine 200, and different drive signals may be transmitted to the respective drive mechanisms and controlled independently of each other.

The above series of processing steps in the work machine 200 is continuously executed every predetermined time. That is, if a predetermined work performed by the operator is not completed, the processing returns to Step S201 again. On the other hand, when the operator completes the predetermined work and performs the stop processing (powering off engine, etc.), the processing step of the work machine 200 is ended.

With the above-described remote operation apparatus 100 according to the first example embodiment, the operation speed of the work machine 200 is calculated based on the magnitude of the operation calculated by the operation calculation unit 108, the operation change amount calculated by the operation change amount calculation unit 109, and the communication delay time measured by the communication delay time measurement unit 110. Thus, the remote operation apparatus 100 can appropriately adjust the operation speed of the work machine 200 even via the communication network N in which the communication delay occurs. It is therefore possible to provide the remote operation apparatus 100, the remote operation method, the remote operation program, and the remote operation system 10 that can remotely operate the work machine 200 efficiently and with high accuracy even via the communication network N.

The speed calculation unit 111 calculates the operation speed V so that the operation speed V is reduced as the communication delay time d becomes longer, and the amount of suppressing the operation speed V is lessened when the operation change amount (steering angular velocity ω of the lever) becomes larger than the predetermined threshold ωr. It is thus possible to effectively prevent overshoot from occurring, thereby improving the work efficiency of the work machine 200.

In the calculation of the operation speed in the speed calculation unit 111, the maximum value of a speed control function γ for adjusting the speed suppression amount according to the steering angular velocity ω of the lever of the operation input unit 101 is set to a predetermined value (βd+1). Thus, the operation speed V of the work machine 200 may be adjusted so as not to exceed the value (function F(θ)) of the operation speed of the work machine 200 when the work machine 200 is manually operated by the operation lever of the driver's seat provided in the work machine 200. By doing so, the operation speed V of the work machine 200 is not increased higher than the original operation speed V, and thus the safety can be ensured.

The speed calculation unit 111 performs smoothing processing on the latest operation speed value V using the calculated latest operation speed V and the past operation speed V stored in the storage unit 105. In this way, it is possible to prevent the fluctuation in the operation speed V between the respective elapsed times from increasing by the fluctuation amount of the communication delay time d, thereby improving the operability of the remote operation.

Note that the present disclosure is not limited to the above-described example embodiment, and may be modified as appropriate without departing from the spirit of the disclosure. For example, the work machine 200 may be provided with a driver's seat. The driver's seat may include various operation levers in a manner similar to the operation input unit 100 of the remote operation apparatus 101. More specifically, the work machine 200 according to the present disclosure may be a work machine including an ordinary driver's seat, and equipped with a video acquisition unit such as a camera for capturing images of the surroundings of the work machine, a communication module for communicating with the remote operation apparatus 100, and so on, as additional components. In such a case, the operation lever of the driver's seat of the work machine 200 may also be inclined in the same axial direction, the same steering angle, and the same steering angular velocity as the axial direction, the steering angle, and the steering angular velocity at which the lever of the operation input unit 101 of the remote operation apparatus 100 is steered. Further, the magnitude of the operation (axial direction of steering and steering angle) and the operation change amount (steering angular velocity) of the operation input to the operation input unit 101 of the remote operation apparatus 100 may be the same as the magnitude and the operation change amount of the operation of the operation lever of the driver's seat of the work machine 200, respectively. Furthermore, if the operation speed when the drive unit (buckets, etc. of the backhoe) of the work machine 200 operates has a predetermined relationship, such as a proportional relationship, with the magnitude of the operation of the operation lever in the driver's seat of the work machine 200, and the magnitude and the operation change amount (steering angular velocity) of the operation input to the operation input unit 101 of the remote operation apparatus 100 (axial direction of steering and steering angle) may be different from the magnitude and the operation change amount of the operation of the operation lever of the driver's seat of the work machine 200, respectively.

In the above example embodiments, the present disclosure has been described as a hardware configuration, but the present disclosure is not limited to this. The present disclosure can be also achieved by causing a CPU (Central Processing Unit) to execute the computer program to thereby execute the processing procedure described in the flowcharts of FIGS. 7 to 9. The above-mentioned program mentioned in the first and second example embodiments can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

The whole or part of the embodiments disclosed above can be described as, but not limited to, the following supplementary notes.

(Supplementary Note 1)

A remote operation apparatus for remotely operating a work machine via a communication network, the remote operation apparatus comprising:
- an operation input unit configured to input an operation signal to the remote operation apparatus, the operation signal in response to an operation performed by an operator for remotely operating the work machine;
- an operation calculation unit configured to acquire a magnitude of the operation input to the operation input unit from the operation signal;
- an operation change amount calculation unit configured to acquire an operation change amount representing a degree of change in the magnitude of the operation from the operation signal;
- a communication delay time measurement unit configured to measure, as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and
- a speed calculation unit configured to calculate an operation speed when the work machine is driven based on the magnitude of the operation, the operation change amount, and the communication delay time.

(Supplementary Note 2)

The remote operation apparatus according to Supplementary note 1, wherein
the speed calculation unit is configured to calculate the operation speed in such a way that the operation speed is suppressed as the communication delay time becomes longer, and an amount of the suppression of the operation speed is lessened when the operation change amount becomes larger than a predetermined value.

(Supplementary Note 3)

The remote operation apparatus according to Supplementary note 1 or 2, further comprising a storage unit configured to store the operation speed calculated by the speed calculation unit, wherein
the speed calculation unit is configured to perform smoothing processing on the calculated latest operation speed using the operation speed stored in the storage unit.

(Supplementary Note 4)

A remote operation method performed by a remote operation apparatus for remotely operating a work machine via a communication network, the remote operation method comprising:
calculating, by the remote operation apparatus, a magnitude of an operation input to an operation input unit from an operation signal, the operation signal being input from the operation input unit of the remote operation apparatus for operating the work machine and in response to an operation of the operation input unit by an operator;
calculating, by the remote operation apparatus, an operation change amount representing a degree of change in the magnitude of the operation from the operation signal;
measuring, by the remote operation apparatus as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and
calculating, by the remote operation apparatus, an operation speed when the work machine is driven based on the magnitude of the operation, the operation change amount, and the communication delay time.

(Supplementary Note 5)

The remote operation method according to Supplementary note 4, wherein the remote operation method comprising:
calculating, by the remote operation apparatus, the operation speed in such a way that the operation speed is suppressed as the communication delay time becomes longer, and an amount of the suppression of the operation speed is lessened when the operation change amount becomes larger than a predetermined value.

(Supplementary Note 6)

The remote operation method according to Supplementary note 4 or 5, wherein the remote operation method comprising:
storing, by the remote operation apparatus, the calculated operation speed, and
performing smoothing processing on the calculated latest operation speed using the stored operation speed, by the remote operation apparatus.

(Supplementary Note 7)

The remote operation method according to any one of Supplementary notes 4 to 6, wherein the remote operation method comprising:
transmitting, by the remote operation apparatus, information about the operation speed to the work machine via the communication network,
converting, by the work machine, the received information about the operation speed into a drive signal for driving a drive unit of the work machine, and
driving, by the drive unit, a drive mechanism of the work machine at a speed based on the drive signal.

(Supplementary Note 8)

A remote operation program for causing a remote operation apparatus to remotely operate a work machine via a communication network, the remote operation program causing the remote operation apparatus to execute:
a process of acquiring a magnitude of an operation input to an operation input unit from an operation signal, the operation signal being input from the operation input unit of the remote operation apparatus for operating the work machine and in response to an operation of the operation input unit by an operator;
a process of acquiring an operation change amount representing a degree of change in the magnitude of the operation from the operation signal;

a process of measuring, as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and a process of calculating an operation speed when the work machine is driven based on the magnitude of the operation, the operation change amount, and the communication delay time.

(Supplementary Note 9)

The remote operation program according to Supplementary note 8, the remote operation program causing the remote operation apparatus to execute a process of calculating the operation speed such that the operation speed is suppressed as the communication delay time becomes longer, and an amount of the suppression of the operation speed is lessened when the operation change amount becomes larger than a predetermined value.

(Supplementary Note 10)

The remote operation program according to Supplementary note 8 or 9, the remote operation program causing the remote operation apparatus to execute:

a process of storing the calculated operation speed, and a process of performing smoothing processing on the calculated latest operation speed using the stored operation speed.

(Supplementary Note 11)

The remote operation program according to any one of Supplementary notes 8 to 10 for causing:

the remote operation apparatus to execute a process of transmitting information about the operation speed to the work machine via the communication network;

the work machine to execute a process of converting the received information about the operation speed into a drive signal for driving a drive unit of the work machine; and the drive unit to drive a drive mechanism of the work machine at a speed based on the drive signal.

(Supplementary Note 12)

A remote operation system comprising a work machine and a remote operation apparatus for remotely operating the work machine via a communication network, the remote operation apparatus comprising:

an operation input unit configured to input an operation signal to the remote operation apparatus, the operation signal in response to an operation performed by an operator for remotely operating the work machine;

an operation calculation unit configured to acquire a magnitude of the operation input to the operation input unit from the operation signal;

an operation change amount calculation unit configured to acquire an operation change amount representing a degree of change in the magnitude of the operation from the operation signal;

a communication delay time measurement unit configured to measure, as a communication delay time, an elapsed time from a time when the remote operation apparatus transmits a predetermined signal to the work machine to a time when the remote operation apparatus receives a return signal indicating that the work machine has received the predetermined signal from the remote operation apparatus; and a speed calculation unit configured to calculate an operation speed when the work machine is driven based on the magnitude of the operation, the operation change amount, and the communication delay time.

(Supplementary Note 13)

The remote operation system according to Supplementary note 12, wherein the remote operation apparatus is configured to calculate the operation speed such that the operation speed is suppressed as the communication delay time becomes longer, and an amount of the suppression of the operation speed is lessened when the operation change amount becomes larger than a predetermined value.

(Supplementary Note 14)

The remote operation system according to Supplementary note 12 or 13, further comprising a storage unit configured to store the operation speed calculated by the speed calculation unit, wherein the speed calculation unit is configured to performing smoothing processing on the calculated latest operation speed using the operation speed stored in the storage unit.

(Supplementary Note 15)

The remote operation system according to any one of Supplementary notes 12 to 14, wherein the remote operation apparatus is configured to transmit information about the operation speed to the work machine via the communication network, the work machine is configured to convert the received information about the operation speed into a drive signal for driving a drive unit of the work machine, and the drive unit is configured to drive a drive mechanism of the work machine at a speed based on the drive signal.

Although the present disclosure has been described above with reference to the example embodiments, the present disclosure is not limited by the above. Various changes in the structure and details of the present disclosure can be understood by a person skilled in the art within the scope of the invention.

This application is based upon and claims the benefit of priority from Japanese patent application No. 2018-098095, filed on May 22, 2018, the disclosure of which is incorporated herein in its entirety by reference.

INDUSTRIAL APPLICABILITY

It is possible to provide a remote operation apparatus, a remote operation method, a remote operation program, a non-transitory computer readable medium, and a remote operation system capable of remotely operating a work machine efficiently and with high accuracy.

REFERENCE SIGNS LIST

10 REMOTE OPERATION SYSTEM
100 REMOTE OPERATION APPARATUS
101 OPERATION INPUT UNIT
102 SENSOR UNIT
103 CONTROL UNIT
103A CPU
103B MAIN STORAGE APPARATUS
103C AUXILIARY STORAGE APPARATUS
103D EXTERNAL INTERFACE
104 COMMUNICATION UNIT
105 STORAGE UNIT
106 DISPLAY UNIT
108 OPERATION CALCULATION UNIT
109 OPERATION CHANGE AMOUNT CALCULATION UNIT

110 COMMUNICATION DELAY TIME MEASUREMENT UNIT
111 SPEED CALCULATION UNIT
200 WORK MACHINE
201 COMMUNICATION UNIT
202 CONVERSION UNIT
203 DRIVE UNIT
N COMMUNICATION NETWORK

The invention claimed is:

1. A remote operation apparatus for remotely operating a work machine via a communication network, the remote operation apparatus comprising:
   a memory configured to store instructions; and
   a processor configured to execute the instructions to:
      acquire an operation signal based on a magnitude of an operation input by an operator remotely operating the work machine;
      acquire an operation change amount representing a speed of change at which the operator input the operation;
      measure an elapsed time required for communication between the remote operation apparatus and the work machine; and
      calculate an operation speed of the work machine based on the magnitude of the operation, the operation change amount, and the elapsed time.

2. The remote operation apparatus according to claim 1, wherein the processor is configured to execute the instructions to calculate the operation speed in such a way that the operation speed is determined to be suppressed as the elapsed time becomes longer, and an amount of the suppression of the operation speed is lessened when the operation change amount becomes larger than a predetermined value.

3. The remote operation apparatus according to claim 1, further comprising a storage unit configured to store the operation speed calculated by the unit processor, wherein the processor is configured to execute the instructions to perform smoothing processing on the calculated latest operation speed using the operation speed stored in the storage unit.

4. A remote operation method for remotely operating a work machine via a communication network, the remote operation method comprising:
   calculating, by a processor of a remote operation apparatus, an operation signal based on a magnitude of an operation input an operator remotely operating the work machine;
   calculating, by the processor of the remote operation apparatus, an operation change amount representing a speed of change at which the operator input the operation;
   measuring, by the processor of the remote operation apparatus time, an elapsed time from a time required for communication between the remote operation apparatus and the work machine; and
   calculating, by the processor of the remote operation apparatus, an operation speed of the work machine based on the magnitude of the operation, the operation change amount, and the elapsed time.

5. The remote operation method according to claim 4, wherein the remote operation method comprises:
   calculating, by the processor of the remote operation apparatus, the operation speed in such a way that the operation speed is determined to be suppressed as the elapsed time becomes longer, and an amount of the suppression of the operation speed is lessened when the operation change amount becomes larger than a predetermined value.

6. The remote operation method according to claim 4, wherein the remote operation method comprises:
   storing, by a storage unit of the remote operation apparatus, the calculated operation speed, and
   performing smoothing processing on the calculated latest operation speed using the stored operation speed, by the processor of the remote operation apparatus.

7. The remote operation method according to claim 4, wherein the remote operation method comprises:
   transmitting, by the processor of the remote operation apparatus, information about the operation speed to the work machine via the communication network,
   converting, by the work machine, the received information about the operation speed into a drive signal for driving a motor of the work machine, and
   driving, by the motor, a drive mechanism of the work machine at a speed based on the drive signal.

8. A remote operation system comprising a work machine and a remote operation apparatus for remotely operating the work machine via a communication network, the remote operation apparatus comprising:
   a memory configured to store instructions; and
   a processor configured to execute the instructions to:
      acquire an operation signal indicating a magnitude of an operation input by an operator remotely operating the work machine;
      acquire an operation change amount representing a speed of change at which the operator input the operation;
      measure an elapsed time required for communication between the remote operation apparatus and the work machine; and
      calculate an operation speed of the work machine based on the magnitude of the operation, the operation change amount, and the elapsed time.

9. The remote operation system according to claim 8, wherein the processor is configured to execute the instructions to calculate the operation speed such that the operation speed is determined to be suppressed as the elapsed time becomes longer, and an amount of the suppression of the operation speed is lessened when the operation change amount becomes larger than a predetermined value.

10. The remote operation system according to claim 8, further comprising a storage unit configured to store the operation speed calculated by the unit processor, wherein the processor is configured to execute the instructions to perform smoothing processing on the calculated latest operation speed using the operation speed stored in the storage unit.

11. The remote operation system according to claim 8, wherein the processor is configured to execute the instructions to transmit information about the operation speed to the work machine via the communication network,
   the work machine is configured to convert the received information about the operation speed into a drive signal for driving a motor of the work machine, and
   the motor is configured to drive a drive mechanism of the work machine at a speed based on the drive signal.

12. The remote operation apparatus according to claim 1, wherein the processor is further configured to execute the instructions to:

determine a working status of the work machine; and calculate the operation speed of the work machine based on the working status, the magnitude of the operation, the operation change amount, and the elapsed time.

13. The remote operation apparatus according to claim 12, wherein the working status comprises at least one of slope construction by a backhoe, loading sediment onto a dump truck, and grappling of a block.

14. The remote operation apparatus according to claim 1, wherein the processor is configured to execute the instructions to calculate the operation speed in such a way that the operation speed is determined to be suppressed as the elapsed time becomes longer, and an amount of the suppression of the operation speed is determined to be lessened when the operation change amount becomes larger than a predetermined value.

15. The remote operation apparatus according to claim 12, wherein the processor is further configured to execute the instructions to:

determine the working status of the work machine based on the operation change amount representing the speed of change at which the operator input the operation.

16. The remote operation apparatus according to claim 12, wherein the speed of change at which the operator input the operation is a rotational velocity of a portion of the operator's body, relative to a portion of the remote operation apparatus configured to receive the operator input, and the portion of the remote operation apparatus.

* * * * *